(12) United States Patent
Galmiche (10) Patent No.: US 11,211,852 B2
(45) Date of Patent: Dec. 28, 2021

(54) MAGNETIC CIRCUIT FOR ROTATING ELECTRICAL MACHINE ELEMENT, METHOD AND ASSOCIATED ELECTRICAL MACHINE

(71) Applicant: GE Energy Power Conversion Technology Limited, Rugby (GB)

(72) Inventor: Christophe Galmiche, Grand-Est (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 318 days.

(21) Appl. No.: 16/265,028

(22) Filed: Feb. 1, 2019

(65) Prior Publication Data

US 2019/0267876 A1    Aug. 29, 2019

(30) Foreign Application Priority Data

Feb. 2, 2018  (FR) ........................ 1850895

(51) Int. Cl.
| | |
|---|---|
| *H02K 15/02* | (2006.01) |
| *H02K 1/06* | (2006.01) |
| *H02K 1/18* | (2006.01) |
| *H02K 1/30* | (2006.01) |

(52) U.S. Cl.
CPC .............. *H02K 15/02* (2013.01); *H02K 1/06* (2013.01); *H02K 1/18* (2013.01); *H02K 1/30* (2013.01)

(58) Field of Classification Search
CPC ............ H02K 1/06; H02K 1/18; H02K 1/185; H02K 1/187; H02K 1/28; H02K 1/30; H02K 2201/09

USPC ........................ 310/156.01, 156.22, 216.131
See application file for complete search history.

(56) References Cited

U.S. PATENT DOCUMENTS

| | | | |
|---|---|---|---|
| 6,346,760 | B1 | 2/2002 | Boardman, IV |
| 6,597,081 | B2 | 7/2003 | Dawson et al. |
| 6,766,572 | B2 | 7/2004 | Dawson et al. |
| 7,994,691 | B2 | 8/2011 | George et al. |
| 8,203,248 | B2 * | 6/2012 | Bauch ............... H02K 1/185 310/216.131 |
| 8,274,192 | B2 | 9/2012 | Lokhandwalla et al. |
| 9,263,921 | B2 | 2/2016 | Tanavde et al. |
| 2008/0231138 | A1 * | 9/2008 | Onimaru ............. H02K 1/06 310/216.018 |

(Continued)

FOREIGN PATENT DOCUMENTS

| | | |
|---|---|---|
| EP | 2642646 A1 | 9/2013 |
| GB | 322829 | 12/1929 |

(Continued)

*Primary Examiner* — Tulsidas C Patel
*Assistant Examiner* — Rashad H Johnson
(74) *Attorney, Agent, or Firm* — Wood IP LLC (57) ABSTRACT

A magnetic circuit for a rotary electric machine, a method and an associated electrical machine are described. The magnetic circuit includes an element comprising a plurality of stacks of compacted sheets disposed in an axial direction and clamped between two clamping plates connected by removable retaining bars, where at least one clamping plate includes as many openings as removable retaining bars. The openings of the at least one clamping late and at least one end of each retaining bar are configured to cooperate so that the end of each retaining bar engages a rim of the opening.

13 Claims, 11 Drawing Sheets

(56) References Cited

U.S. PATENT DOCUMENTS

| | | | | |
|---|---|---|---|---|
| 2011/0241455 A1* | 10/2011 | Yoshida | ................... | H02K 1/12 |
| | | | | 310/44 |
| 2011/0254399 A1* | 10/2011 | Blanc | ................... | H02K 1/2773 |
| | | | | 310/156.22 |
| 2011/0266808 A1* | 11/2011 | Lokhandwalla | ....... | H02K 1/148 |
| | | | | 290/55 |
| 2015/0222153 A1* | 8/2015 | Lange | ................... | B60L 3/0061 |
| | | | | 310/51 |

FOREIGN PATENT DOCUMENTS

| | | | |
|---|---|---|---|
| GB | 328661 | A | 5/1930 |
| GB | 660942 | | 11/1951 |
| GB | 2470466 | A | 11/2010 |
| KR | 20120047796 | A | 5/2012 |
| WO | 2017086192 | | 5/2017 |

* cited by examiner

FIG. 1

ART ANTERIEUR

FIG. 2

ART ANTERIEUR

FIG. 17

MAGNETIC CIRCUIT FOR ROTATING ELECTRICAL MACHINE ELEMENT, METHOD AND ASSOCIATED ELECTRICAL MACHINE

I. TECHNICAL FIELD

The present invention relates to a compression device for securing magnetic sheets incorporated in a laminated rotor and/or a laminated stator of an electrical machine. The present invention also relates to a rotating electrical machine comprising such a device and a method of manufacturing such a rotor and stator.

II. BACKGROUND

A laminated stator and/or laminated rotor of a rotating electric machine features a stack of magnetic sheets that substantially circular in shape and held together by tie rods or bars. The tie rods or bars compactly secure and maintain the magnetic sheets. The stator and rotor magnetic sheets comprise a recess at their center intended to receive respectively the rotor and the shaft of the rotating electrical machine.

The rotor and stator magnetic sheets are stacked in an axial direction, that is to say in the direction of the shaft of the rotary electrical machine, compacted in the axial direction, and maintained in the axial direction and the radial direction to prevent the sheets from moving in particular under the effect of the torque generated by the electric machine, under the effect of the magnetic attractions between the rotor and the stator, and under the effect of vibrations and pulsating forces.

Figure 1:
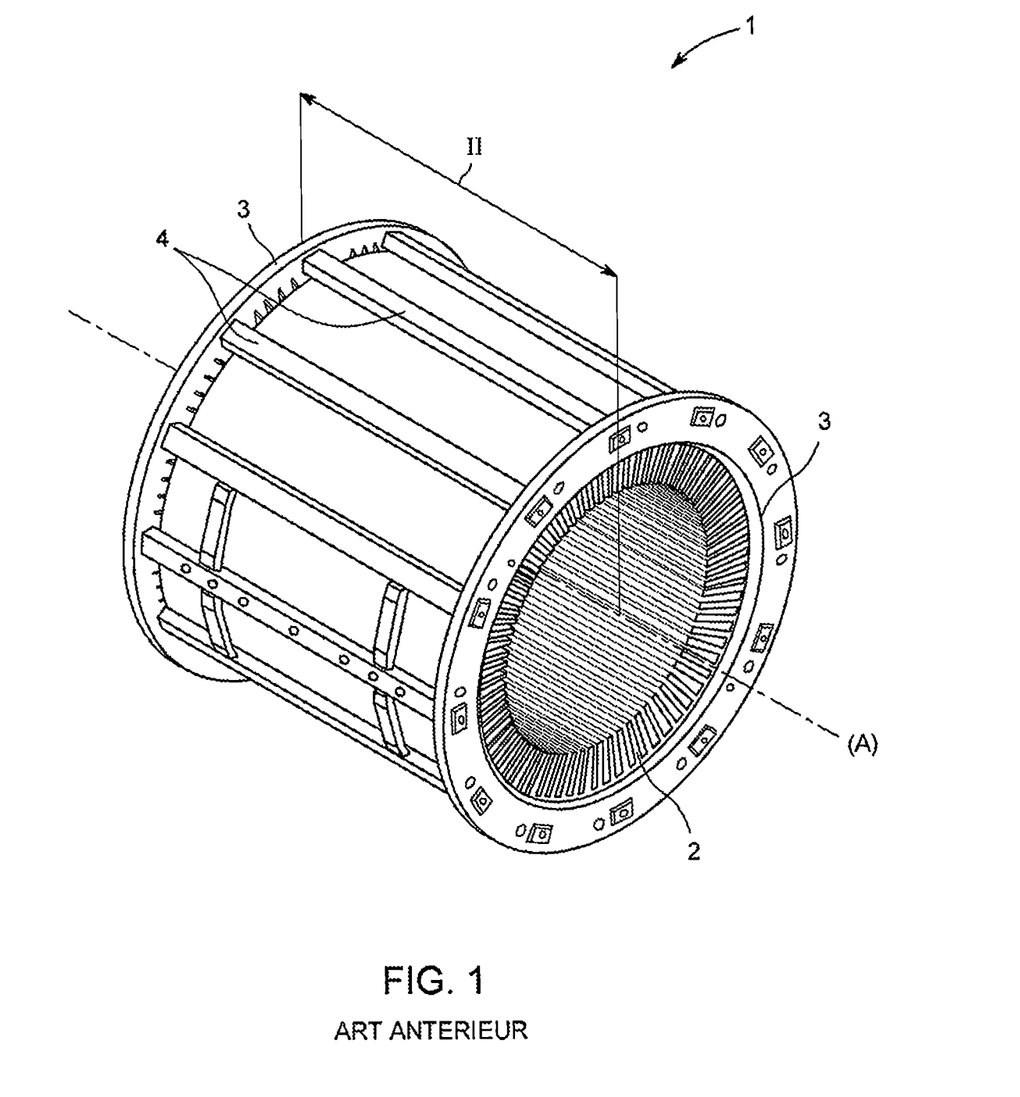
FIGS. 1 and 2 illustrate a stator of an electric rotating machine, according to the state of the art.

FIG. 1 shows an example of a laminated stator 1 of an electric machine known from the state of the art comprising an axis of revolution (A). The stator has for example a mass of 1 to 50 tons and an outside diameter of 0.5 to 5 meters. Following the compaction of the magnetic sheets, the length of the stator is typically decreased by 5 to 15 mm.

The stator 1 comprises packets of magnetic sheets 2 compacted between two clamping plates 3 arranged on either side of the stator and connected by retaining bars 4. The plates 3 and the bars 4 forming the chassis of the stator hold the packets of compacted sheets.

Figure 2:
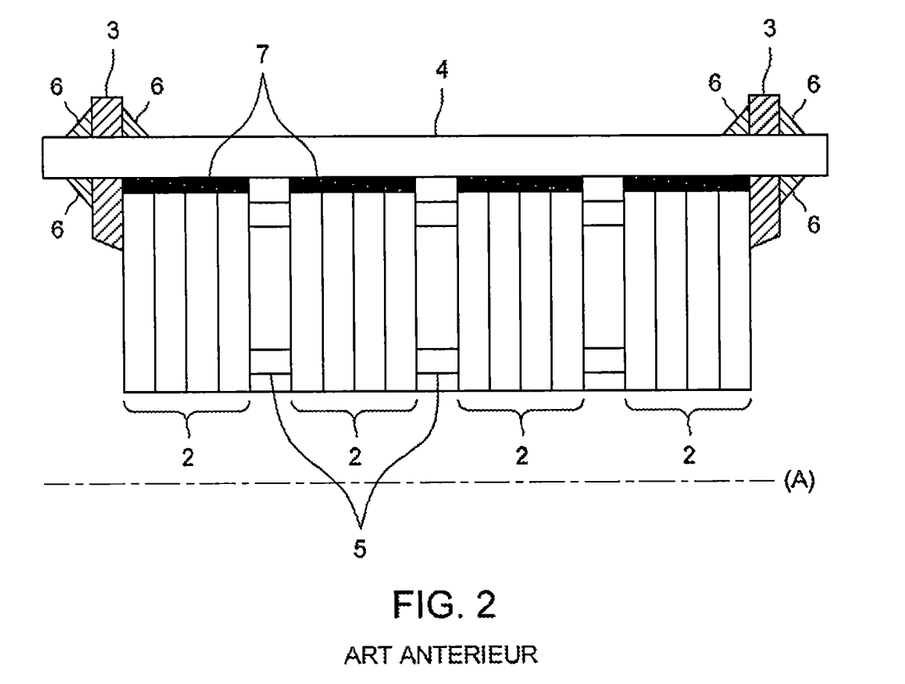

FIG. 2 schematically shows a section of the stator 1, according to the section plane II to the axis (A). The bundles of sheets 2, clamping plates 3 and a retaining bar 4 are shown. The bundles of sheets 2 are separated by spacers 5 forming ventilation channels.

In order to maintain the prestress exerted by the chassis on the magnetic sheets, the bar 4 and the plates 3 are welded together when the sheets 2 are compacted. The welds 6 prevent axial movement and unpacking of the sheets 2. The bundles of sheets 2 may be welded to the bar 4 so as to prevent radial movement of the sheets 2. The sheets 2 are secured to the bars 4 by welds 7.

In the case of a rotor, not shown, the magnetic sheets are sandwiched between two clamping plates held by bars as previously described. The magnetic sheets are secured to the shaft, they are for example assembled by shrink fit or keyed on the shaft of the rotating machine.

We can in this respect refer to EP2642646 documents U.S. Pat. No. 9,263,921 and GB322829 describing bars welded directly to the clamping plates as previously described or clamping plates keyed onto bars welded to the chassis of a rotating electrical machine. However, the welding operations require handling and manipulating the stator. This operation is complex for a stator that weighs for instance 50 tons and with an outer diameter of 5 meters. In addition, solder scrap resulting from welding operations are likely to get lodged in the ventilation channels and damage the windings of the rotating machine during operation. To reduce the risks associated with the scraps of welding, it is necessary to obstruct the ventilation channels, for example, by stuffing them with cords. This welding preparation operation is tedious and time consuming.

Another known compacting and holding device of the state-of-the-art comprises clamping plates configured to clamp the magnetic sheets, and tie rods passing through the sheets and connecting the clamping trays by screws or nuts arranged at the ends of the tie rod.

It is also possible to refer to the document WO2017/086192 which describes a device for compacting and holding magnetic sheets, comprising a clamping screw that replaces the welds. Documents GB328661 and GB660942 also describe a compacting device and holding the magnetic sheets comprising clamping plates fitted in grooves or shoulders situated in the chassis. However, magnetic sheet holding devices known in the state-of-the-art are, for some, non-removable, and they require complex handling operations and complex welding operations.

Most of the devices according to the state-of-the-art have the disadvantage of requiring a unitary adjustment of the compaction voltage and require a de-compacting and compacting operation of the sheets during a change of an element of the stator's chassis or a change of the rotor shaft of the rotating machine.

III. SUMMARY

It is therefore proposed to overcome the disadvantages associated with devices for holding and compacting magnetic sheets of a laminated rotor and/or a laminated stator according to the-state of-the-art. In view of the above, the invention proposes, according to one aspect, a magnetic circuit for a rotating electrical machine element comprising a plurality of stacks of magnetic sheets compacted in an axial direction and sandwiched between two clamping plates connected by removable retaining bars, with at least one clamping plate comprising as many openings as removable retaining bars.

According to a general characteristic of this magnetic circuit, the openings of at least one clamping plate and at least one end of each retaining bar are configured to cooperate so that the end of each retaining bar engages a rim of the opening.

According to another feature, at least one end of the bar has a groove cooperating with an opening of at least one clamping plate to maintain the compacted magnetic sheets, according to the axial direction.

According to another feature, at least one end of the bar has a groove cooperating with an opening of at least one clamping plate to maintain the compacted magnetic sheets, according to the axial direction.

Preferably, the bar fits in a radial direction on a rim of the opening.

Advantageously, the bar fits in a direction perpendicular to the radial direction on a rim of the opening.

According to another embodiment, the magnetic circuit further includes a second opening in the clamping plate and at least one second retained bar identically to the retained bar cooperating with an opening of at least one clamping plate for maintaining magnetic sheets compacted according to an axial direction, the bar fitting according to the perpendicular directions to the radial direction and opposite relative to the other.

According to another embodiment, the retaining bar comprises between its two ends a central portion and each magnetic sheet comprises at least one notch configured to receive the central portion so that the magnetic sheets are immobilized in a radial direction and rotation in the axial direction.

Preferably, the retaining bar comprises at least one of its ends a groove cooperating with an opening of the clamping plate to maintain the compacted magnetic sheets in the axial direction, and comprising at least one shim configured so that when the shim is depressed in the axial direction between the retaining bar and an edge of the opening, the central portion abuts against an edge of the indentation and the bottom of the groove is not in contact with the clamping plate so that the magnetic sheets are immobilized according to a radial direction and rotated in an axial direction.

Advantageously, the retaining bar further comprises at its end a chamfer and the shim has an inclined surface cooperating with the chamfer.

Preferably, the inclined surface, chamfer, groove, indentations and profile of the central portion are configured so that the shim is driven from the outside of the magnetic circuit between the milling and an edge of the opening.

Advantageously, the inclined surface, chamfer, groove, indentations and profile of the central portion are configured so that the shim is driven from the interior of the magnetic path between the milling and an edge of the opening.

According to another characteristic, the magnetic circuit comprises of further screws, the retaining bar include at least one of its ends a groove cooperating with an opening of the clamping plate to hold the magnetic sheets compacted according to the axial direction. The plate comprises at least one attachment zone comprising threads cooperating with the screws so that when the screws are screwed into the threads, the groove engages an edge of the opening opposite to the zone.

Advantageously, at least one central portion of the retaining bar has a rectangular, cylindrical, square or trapezoidal profile.

In another aspect, there is provided a rotor and/or a stator for rotating electrical machine incorporating a magnetic circuit as defined above.

According to yet another aspect, there is a provided electric machine incorporating a stator and/or a rotor as defined above. According to yet another aspect, there is a provided method for producing a magnetic circuit for a rotating electrical machine element comprising a plurality of magnetic sheets stacks, retaining bars, two clamping plates, at least one plate clamping device comprising as many openings bars, at least one end of each retaining bar being configured to fit into the opening. The process comprises of an axial compaction step in which the magnetic sheets are compacted, and a mounting step in which at least one end of the retaining bars is engaged in an opening.

According to one embodiment of the method, each compacted magnetic sheet comprises at least one indentation and each retaining bar comprises at each of its ends a groove and a chamfer and between its two ends a central part, and shims. During the mounting step, the central portion is arranged so that it is partially in the indentation and one side of each of the two grooves in contact with one of the two plates. The method comprises of one step during which pushes the shims according to an axial direction until the central portion of the bar is immobilized against an edge of the indentation.

According to another implementation of the method, each compacted magnetic sheet composed of at least one indentation and each retained bar include at each of its ends a groove and between its two ends a central portion, and shims, during the mounting step, the central portion is further disposed so that it is partially in the indentation and one side of each of the two grooves is in contact with one of the two plates, the method comprising a step during which one pushes the shims until the central part of the bar is immobilized against one edge of the indentation. Advantageously, the step of mounting and locking until all the bars are connected to the clamping plates are repeated. According to yet another aspect, there is a provided method of producing a rotor and/or a stator for rotating electrical machine comprising process steps defined above.

Other characteristics and advantages of the invention will appear on reading the following description of embodiments of the invention, given solely by way of nonlimiting examples and with reference to the drawings.

V. DETAILED DESCRIPTION

The present disclosure relates, in no limiting manner, to an embodiment of a rotary electric machine comprising a magnetic circuit comprising stacks of magnetic sheets stator or rotor clamped between two clamping plates connected by bars of retained included in the stator and/or rotor of the rotating electrical machine. Of course, it is not beyond the scope of the invention when the rotor is made from such a magnetic circuit or when the rotating electrical machine is equipped with a stator or a rotor, a rotor and stator, made from such a magnetic circuit.

Figure 3:
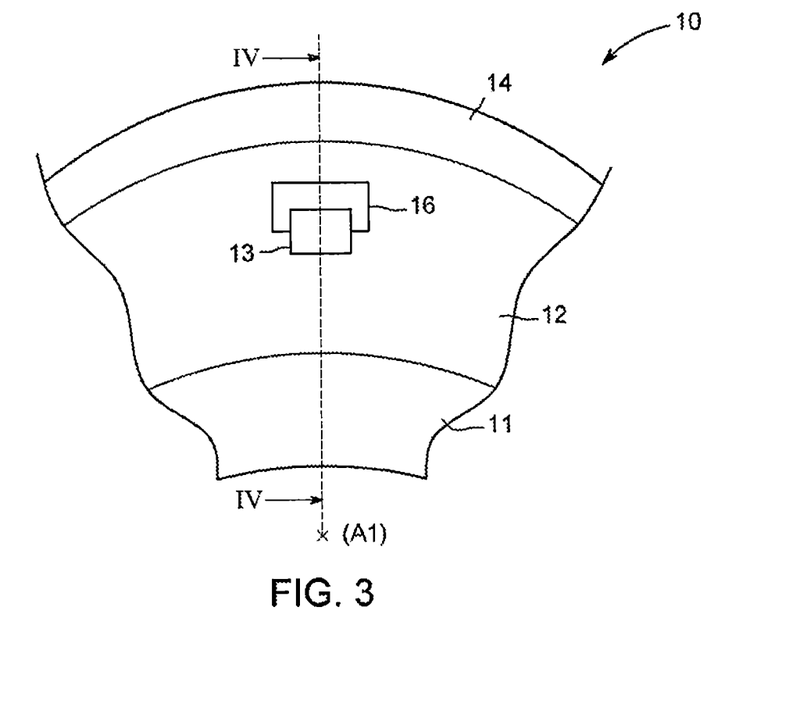
FIGS. 3 and 4 illustrate a first embodiment of a stator of a rotary electric machine comprising a magnetic circuit of which the magnetic sheets are maintained compacted.
Figure 4:
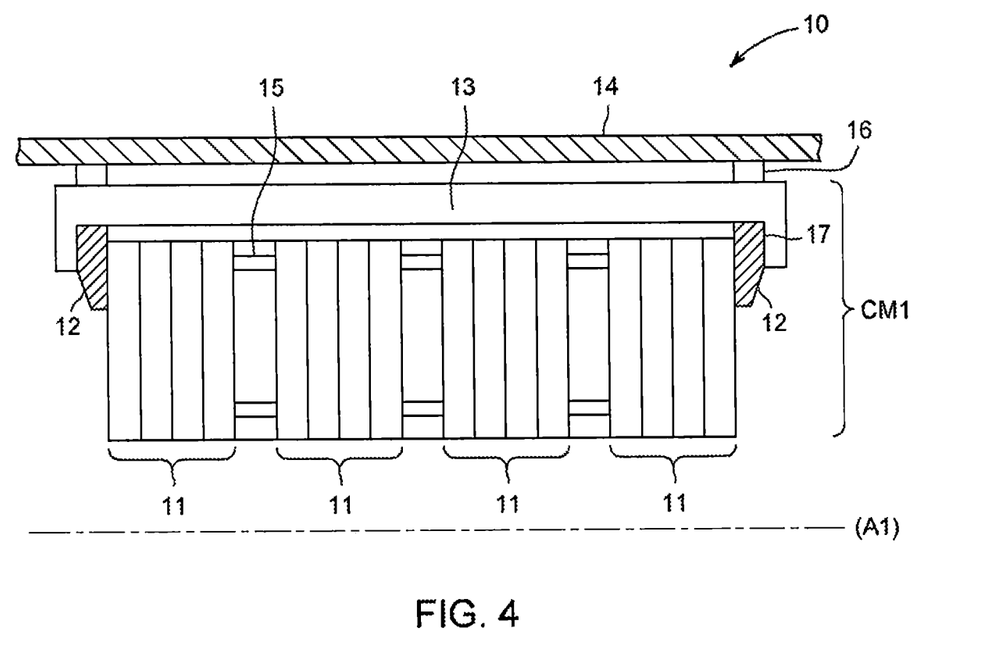

FIGS. 3 and 4 illustrate a portion of a first embodiment of a stator 10 and a half-section of the cylindrical stator 10 of a rotating electric machine. The stator 10 is intended to receive a rotor in its central space comprising an axis of revolution (A1). The stator 10 includes a magnetic circuit CM1 comprising packs of magnetic sheets 11 compressed between two clamping plates 12 arranged on either side of the stator and connected by retained bars 13 evenly distributed as represented here on an outer periphery of the magnetic sheets, according to the axial direction (A1), and a chassis 14 encompassing the magnetic circuit.

According to another embodiment, the retaining bars 13 may be re-formed in any manner on an outer periphery of the magnetic sheets in the direction of the axis (A1). The retained bars 13 maintain the compacted sheets and are the minimum number of two. For the sake of clarity, only one bar 13 is shown. The magnetic circuit CM1 of cylindrical shape is integrated in the chassis 14 of cylindrical shape as shown here and connected to the chassis in a removable manner for example by screwing. The chassis 14 may be of any shape, particularly square. The magnetic circuit CM1 further comprises of windings maintained by slots in a bundle of sheets. Two adjacent magnetic sheets 11 may be separated by spacers 15 to create a ventilation channel as shown here.

Each clamping plate 1 and 2 includes as much opening 16 as the number of bars 13 evenly or unevenly distributed in clamping plate 12 periphery according to the axial direction (A1). At least one end of the bar 13 is configured to fit in a radial direction on a flange of the opening 16. The ends of the retaining bars and the openings 16 in the clamping plate 12 so are incorporated in a holding means configured to hold the compacted magnetic sheets and immobilize the sheets in an axial direction (A1).

The holding means can be transposed by those skilled in the art in the case of a rotary electric machine rotor. The free end of the bar 13 can for example be welded to the clamping plate or fixed by clamping, keying or screwing the clamping plate. The bar 13 may comprise without limitation a groove 17 which extends over the entire length of the bar as shown here and configured to fit over a flange of the opening 16, a groove extending over at least one end thereof and configured to fit onto a flange of an opening 16, or an insert and screwed or welded to at least one end of the bar 13 so that the bar and the insert forms a hook configured to fit over a flange of the opening 16.

The bar 13 may be rectangular, cylindrical, square or trapezoidal. The bar 13 is for example machined, molded. It is made for example of steel, aluminum, copper or cast iron.

Advantageously, the magnetic circuit CM1 the stator 10 is removable from the chassis 14 without unpacking magnetic sheets 11. It just needs to unmount the magnetic circuit CM1 and remove the circuit CM1 of chassis 14.

Figure 5:
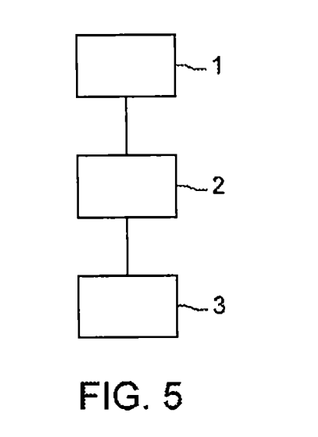
FIG. 5 discloses a method for obtaining a magnetic circuit of which the magnetic sheets are maintained compacted.

FIG. 5 illustrates a process for obtaining the stator 10. In a first axial compacting step 1, the packets of magnetic sheets 11 separated by spacers 15 or not separated, and sandwiched between the two clamping plates 12 comprising the openings 16 are compacted for example by a press. When the required axial compaction pressure is reached, in a mounting step 2, at least a first end of each bar 13 is fitted on a flange of an opening 16 of a first clamping plate so that one of the sides of the groove 17 is in contact with one of the trays 12 and the second end of the bar is connected to the second clamping plate. Step 2 is repeated until all the bars 13 are mounted in the magnetic circuit CM1. Then in a mounting step 3, the magnetic circuit obtained is extracted from the press and is integrated and secured to the chassis 14. The magnetic sheets are held compacted seamless. Therefore, no welding is necessary which reduces the duration of assembly operations. The magnetic circuit CM1 can be pre-assembled thus the handling operations are simplified.

Figure 6:
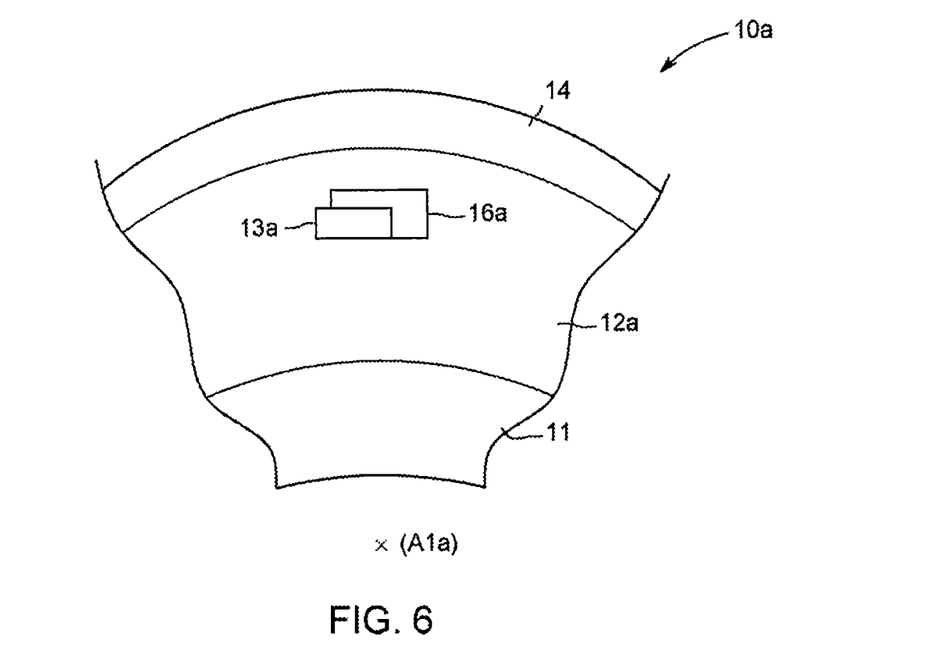
FIG. 6 illustrates a second embodiment of a stator of a rotary electric machine comprising a magnetic circuit of which the magnetic sheets are maintained compacted.

FIG. 6 illustrates a portion of a second embodiment of a cylindrical stator 10a of a rotating electrical machine. The identical references designate the same elements as previously described. The stator 10a comprises a magnetic circuit comprising the packages of magnetic sheets 11 compacted between two clamping plates 12a disposed on either side of the stator and connected by retaining bars 13a distributed on an outer periphery of the magnetic sheets, according to the direction of the axis (A1a), and the chassis 14 encompassing the magnetic circuit.

In this embodiment, the retaining bar 13a differs from the bar 13 described above in that it fits in a direction perpendicular to the radial direction on a flange of an opening 16a incorporated in the clamping plate 12a.

Figure 7:
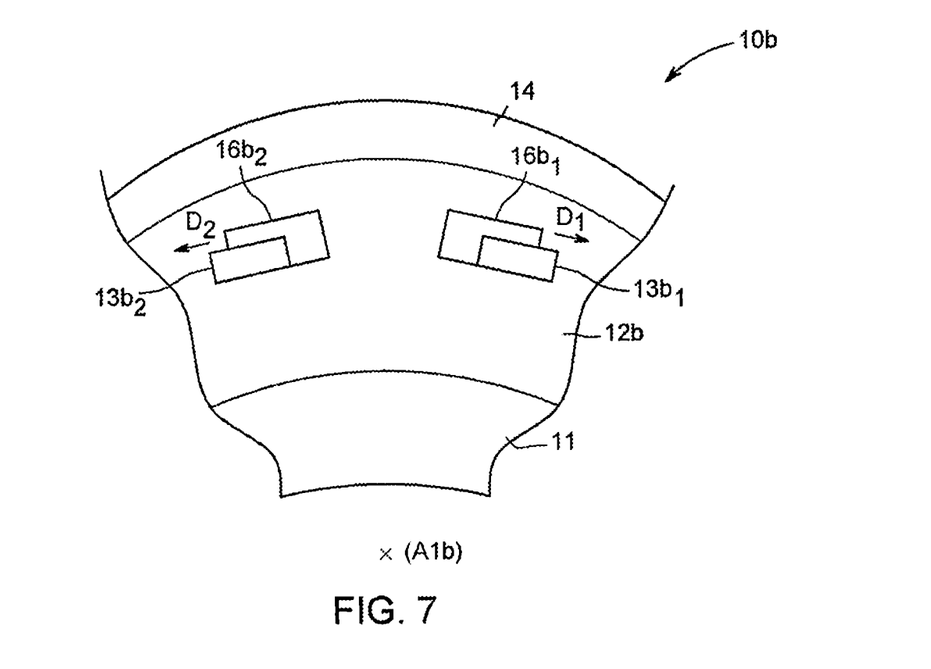
FIG. 7 illustrates a third embodiment of a stator of a rotary electric machine comprising a magnetic circuit of which magnetic sheets are maintained compacted.

FIG. 7 illustrates a portion of a third embodiment of a cylindrical stator 10b of a rotating electrical machine. The identical references designate the same elements as previously described.

Stator 10b takes a magnetic circuit comprising the packs of magnetic sheets 11 compressed between two clamping plates 12b arranged on either side of the stator and connected by a first retaining bar 13b1 and a second retaining bar 13b2 distributed on an outer periphery of the magnetic sheets in the direction of the axis (A1b), and the chassis 14 encompassing the magnetic circuit.

In this embodiment, the retaining bar 13b1 and 13b2 from 13 described previously in that it fits in a direction perpendicular to the radial direction respectively on a flange of an opening 16b1 and 16b2 s incorporated in the clamping plate 12b.

The bars 13b1 and 13b2 fit into the openings 16b1 and 16b2 13b1 so that the bar engages in a direction D1 perpendicular to the radial direction and 13b2 bar engages in a D2 direction perpendicular to the radial direction and opposite to the direction D1 of interlocking of the first bar 13b1.

In the case of a magnetic circuit having a plurality of retaining bars, two successive retaining bars fit together, according to the direction opposite interlocking. Alternatively, a first batch including several bars 13b1 successively nested is followed by a second batch comprising several bars 13b2, the first and second batches succeeding each other. According to another variant, a first half of the successive bars of the magnetic circuit are as referenced 13b1 and a second half of the successive bars of the magnetic circuit are as referenced 13b2.

Figure 8:
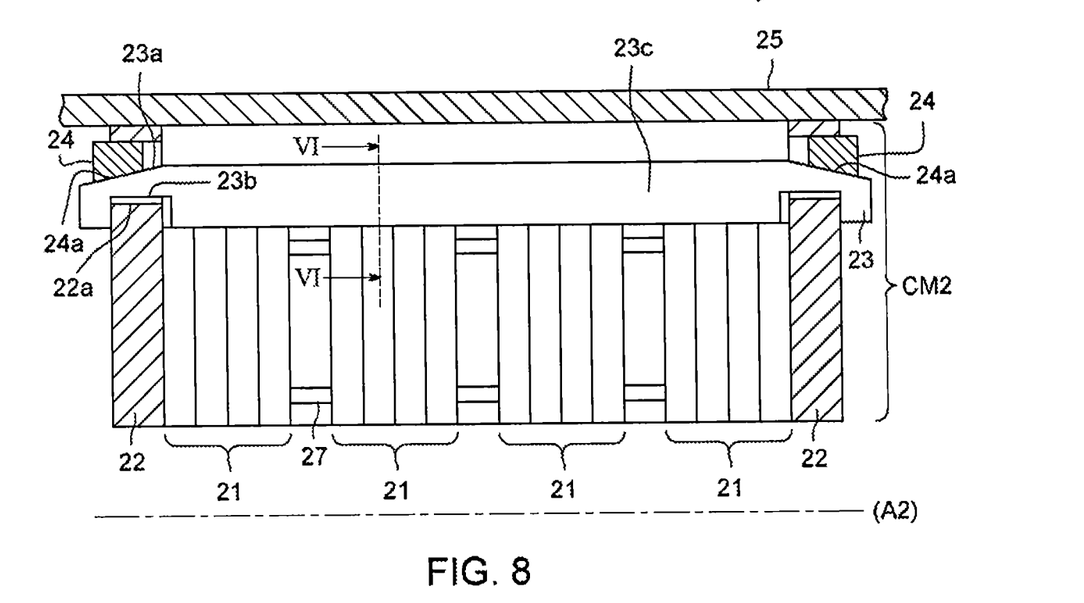
FIGS. 8 and 9 illustrate a first embodiment of a magnetic circuit of which the sheets are held and immobilized compacted are incorporated in a stator.
Figure 9:
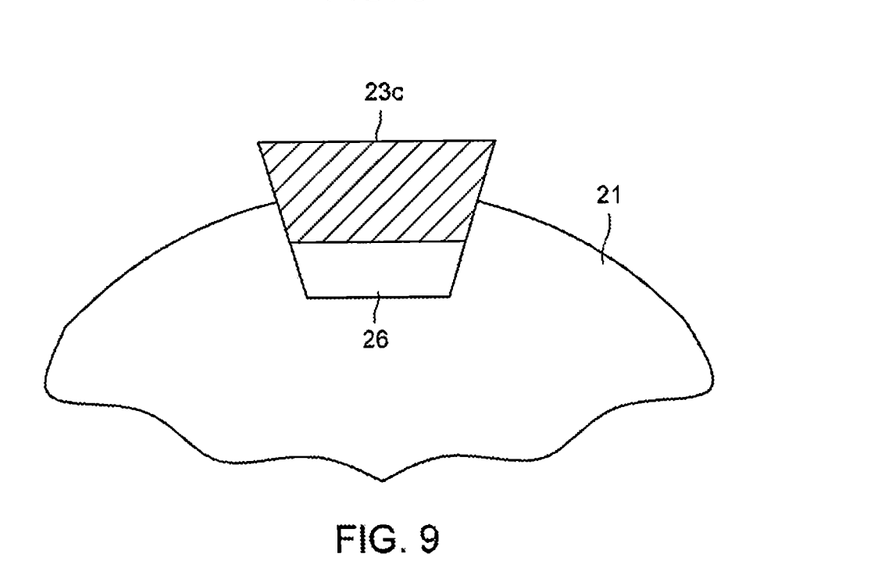

Referring to FIGS. 8 and 9 which illustrates t half a cup a first embodiment of a magnetic circuit of which the sheets are held and immobilized compacted and are incorporated in a stator 20 of cylindrical form of a rotating electrical machine and the section VI-VI shown in FIG. 8. The stator 20 is intended to receive a rotor in its central space comprising of an axis of revolution (A2).

The magnetic sheets are kept compacted and immobilized in a radial direction and in rotation according to a first embodiment of the magnetic circuit. The stator 20 includes a CM2 magnetic circuit comprising two packs of magnetic sheets 1 compacted between two clamping plates 22 arranged on either side of the stator and connected by retaining bars 23 evenly distributed as shown here on an outer periphery of the magnetic sheets and held by shims 24 in the direction of the axis (A2), and a chassis 25 encompassing the magnetic circuit.

According to another embodiment, the retaining bars 23 may be in any part on an outer periphery of the magnetic sheets in the direction of the axis (A2). For the sake of clarity, only one bar 23 is shown. The magnetic circuit CM2 of cylindrical shape is integrated in the chassis 25 and connected to the chassis in a removable manner, for example by screwing. The magnetic circuit CM2 further comprises unrepresented coils held by notches formed by the sheet packs.

Two adjacent magnetic sheets 21 may be separated by spacers 27 so as to create a ventilation channel as shown here. Each magnetic sheet comprises a indentation 26. The retaining bar 23 may comprise at each of its two ends a chamfer 23a and a groove 23b as shown here. The shim 24 has an inclined face 24a cooperating with the chamfer 23a. According to other embodiments, the retaining bar 23 may comprise at one of its two ends a chamfer 23a and a groove 23b and at the other end of the bar 23 may for example be welded to a clamping plate 22 or fixed by clamping, keying or screwing to the clamping plate 22. The central portion 23c of the bar 23 may be rectangular, cylindrical, square or trapezoidal. The shape of the indentation 26 is configured so that when the central portion 23c is depressed into the notch, the magnetic sheet is immobilized in a radial direction and in rotation according to the axial direction(A2).

Each clamping plate 22 comprises as many openings 22a only 23 bars or not uniformly distributed on a periphery of the clamping plate 22 in the axial direction (A2). The opening 22a is configured so that the bar 23 can pass through the opening in the direction of its length.

The shim 24, the inclined face 24a, the chamfer 23a, the groove 23b, the indentations 26 and the profile of the central portion 23c are configured so that when the shim 24 is driven from the outside of the magnetic circuit CM2 between the milling 23a and an edge of the opening 22a, the portion 23c abuts against an edge of the indentation 26 and the bottom of the groove 23b does not come into contact with the plate 22.

For example, a part 23c can be of trapezoidal section as shown here. In this case, the indentation 26 is trapezoidal in section. The shims 24 are depressed until the edges of the portion 23c abut with the edges of the indentation 26.

The magnetic sheets are maintained in a radial direction and in rotation according to the axial direction (A2) by the central portion 23c cooperating with the indentation 26, and in axial direction by the retaining bar 23 without the CM2 circuit is statically indeterminate.

The bar 23 is for example machined, molded. It is made for example of steel, aluminum, copper or cast iron.

The bars 23, the shims 24, the indentations s 26 and the openings 22a are incorporated in a first configuration of holding and immobilization means configured to hold the compacted magnetic sheets and immobilize them in axial and radial directions, and to prevent rotation of the plates according to the axial direction (A2).

Advantageously, the magnetic circuit CM2 of the stator 20 can be dismantled from the chassis 25 without decompressing the magnetic sheets 21.

It is sufficient to de-solidify the magnetic circuit CM2 and to withdraw the circuit CM2 from the chassis 25.

Figure 10:
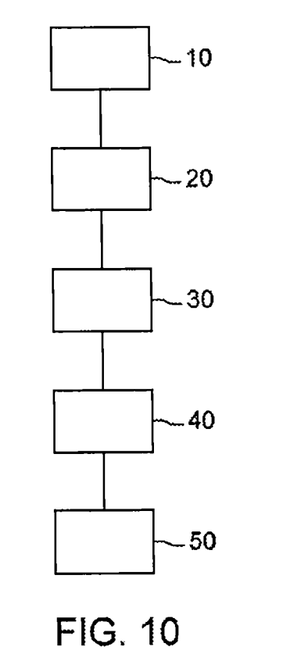
FIG. 10 discloses a method for obtaining a magnetic circuit of which the sheets are held and immobilized compacted are incorporated in a stator.

FIG. 10 illustrates a process for obtaining the stator 20. In a first compacting step 10, the bundles of magnetic sheets 21 separated by spacers 27 or not separated, and sandwiched between the two clamping plates 22 comprising the openings 22a are compacted for example by a press. When the required compacting pressure is reached, in a mounting step 20, the bar 23 is positioned so that the central portion 23c is partially in the indentation 26 and one side of each of two groove 23b is in contact with one of two plates 22. In a locking step 30, the shims 24 are depressed until the portion 23c is immobilized in the indentation 26. Steps 20 and 30 are repeated for all the bars and then Then in a step 40, the magnetic circuit CM2 obtained is extracted from the press. One side of the groove 23b resting on the clamping plate 22 maintains the axial compacting of the magnetic sheets. In a mounting step 50, the magnetic circuit CM2 is integrated and secured to the chassis 25. The magnetic sheets are held and compacted and immobilized in a radial direction and a rotation about the axis (A2) is prevented. No welding is necessary which reduces the duration of assembly operations. The magnetic circuit CM2 can be pre-assembled and the planning, manufacturing and handling operations are simplified.

Figure 11:
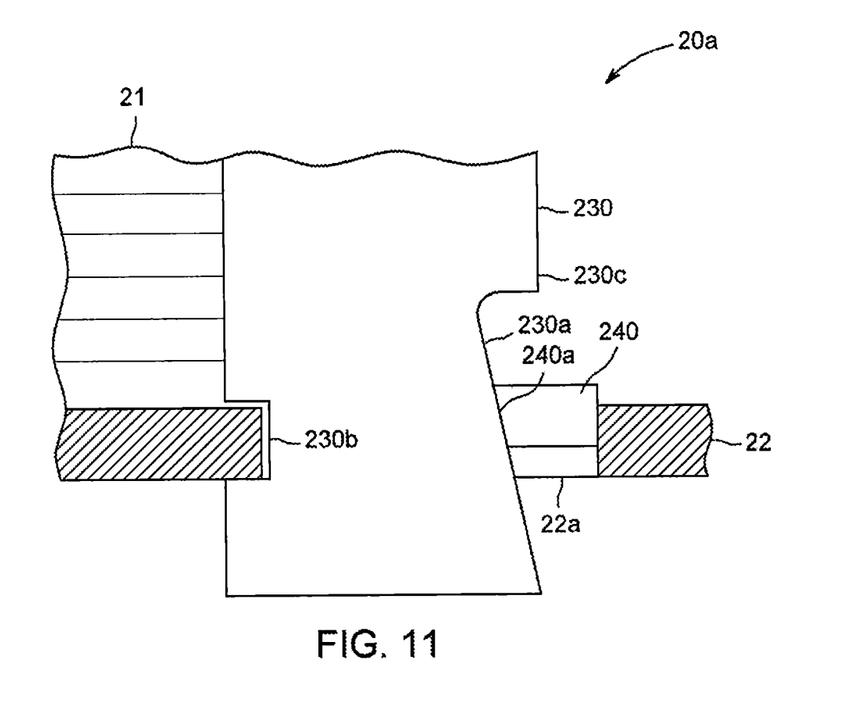
FIG. 11 illustrates a second embodiment of a magnetic circuit of which the sheets are held and immobilized compacted are incorporated in a stator.

FIG. 11 illustrates a portion of a second embodiment of a magnetic circuit of which the sheets are held compacted and immobilized in a stator 20a comprising retaining bars 230 comprising a central portion 230c, clamping plate 22 and shims 240, the identical references designate the same elements as previously described. For the sake of clarity, the portion illustrates the interlocking of the bar 230 on one side of the opening 22a. The retaining bar 230 comprises a chamfer 230a. The shim 240 includes an inclined surface 240a cooperating with the inclined face 230a so that when the shim 240 is pressed by the inside of the magnetic circuit between the plate 22 and the chamfer 230a, the groove 230b is fitted on one face of opening 22a. The production method is identical to that described in FIG. 10.

Figure 12:
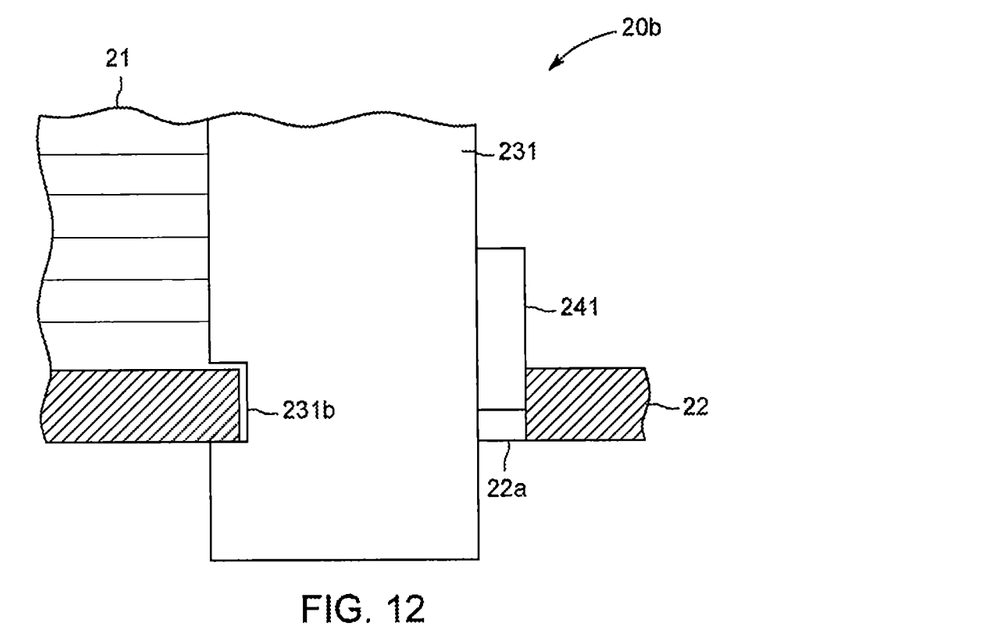
FIG. 12 illustrates a third embodiment of a magnetic circuit of which the sheets are held and immobilized compacted are incorporated in a stator.

FIG. 12 illustrates a portion of a third embodiment of a magnetic circuit of which the sheets are held and immobilized compacted incorporated in a stator 20b comprising retaining bars 231, the clamping plates 22 and holds 241. Further, the identical references designate the same elements. For the sake of clarity, the portion illustrates the interlocking of the bar 231 on one side of the opening 22a. The retaining bar 231 is of rectangular or square section and comprises a groove 231b The shim 241 is of rectangular or square section and cooperates with the bar 231 and the opening 22a in a manner that when the shim 241 is pressed between the plate 22 and the face of the bar 231b opposite to the groove, the groove 231b is fitted on one side of the opening 22a. The production method is identical to that described in FIG. 10.

Figure 13:
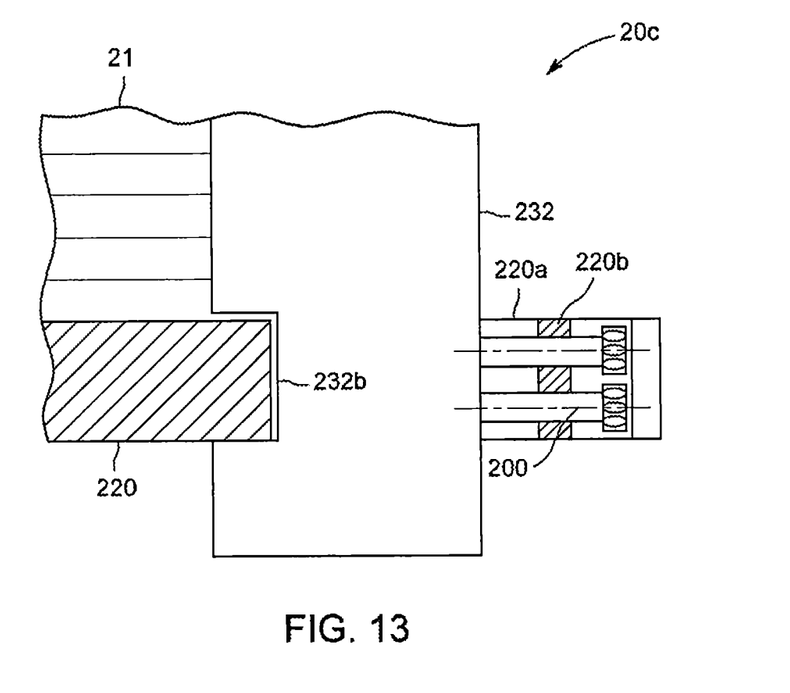
FIG. 13 illustrates a fourth embodiment of a magnetic circuit of which the sheets are held and immobilized compacted é are incorporated in a stator.

FIG. 13 illustrates a portion of a fourth mode of embodiment of a magnetic circuit of which the sheets are held compacted and immobilized in a stator 20c consisting of the retaining bars 232, clamping plates 220 and screw 200, the identical references designate the same elements. For the sake of clarity, the portion illustrates the engagement of the bar 232 on one side of an opening 220a incorporated in the plate 220. The retaining bar 232 is of rectangular or square section and comprises a groove 232b. The plate 220 comprises a fixing zone 20b comprising threads cooperating with the screws 200 so that when the screws 200 are screwed into the threads, the groove 232b is fitted on an edge opposite the zone 220b of the opening 220a. The method of making is different from that described in FIG. 10 in that there is no shim support, the function of the shim being formed by the screws 200 which are screwed on the support retaining bar.

In all these embodiments illustrated in FIGS. 8-13, a person of ordinary skilled in the art understands that the wedges 24, 240, 241 or the screws 200 secure the interlocking of the groove 23*b*, 230*b*, 231*b*, 232*b* of the retaining bar in the opening of the clamping plate, by pressing on the bar preventing it from disengaging from the opening of the clamping plate. Likewise, all of these embodiments shown in FIGS. 8-13 may be associated with the radial holding and rotating magnetic sheets by pressing of the central part 23*c* of the stop bar against an edge of the indentation 26 without the bottom the groove 23*b*, 230*b*, 231*b*, 232*b* of the bar is in contact with the plate 22, 220.

Figure 14:
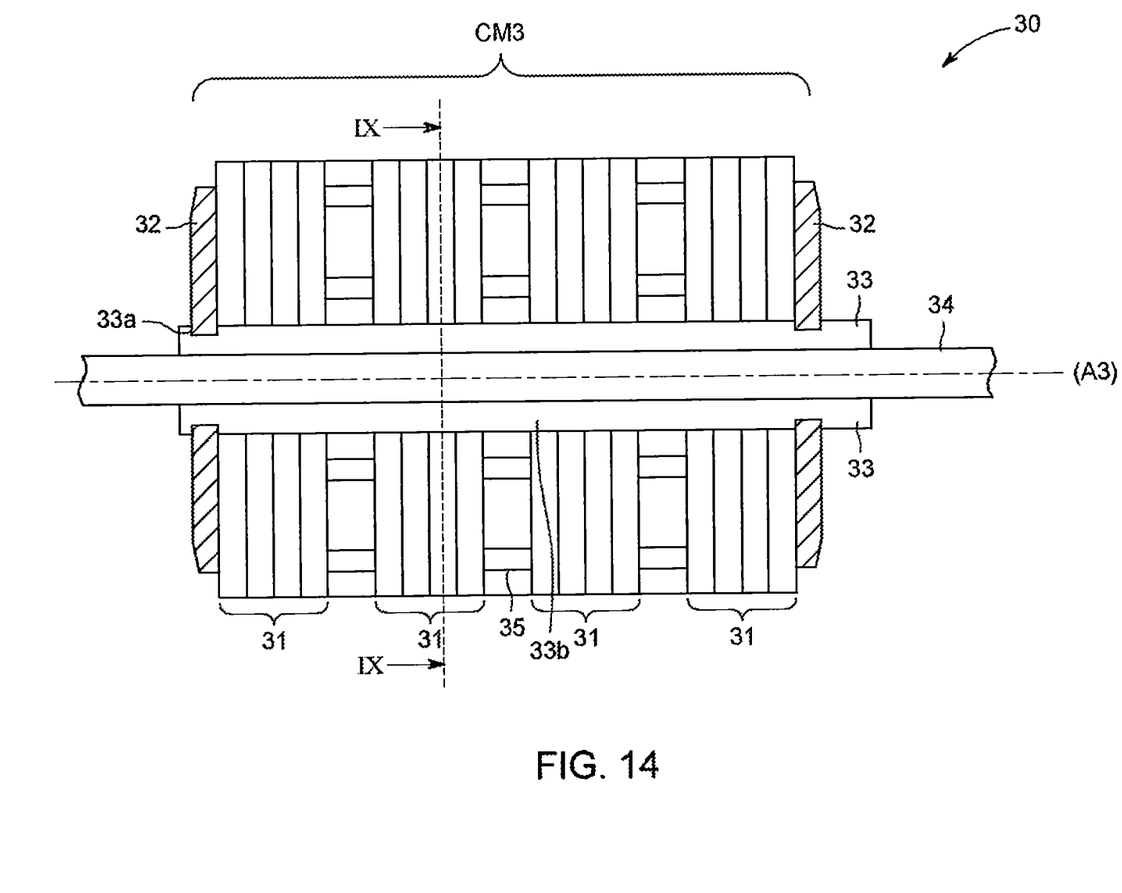
FIGS. 14, 15 and 16 illustrate a fifth embodiment of a magnetic circuit of which the sheets are held and immobilized compacted é are incorporated in a rotor.
Figure 15:
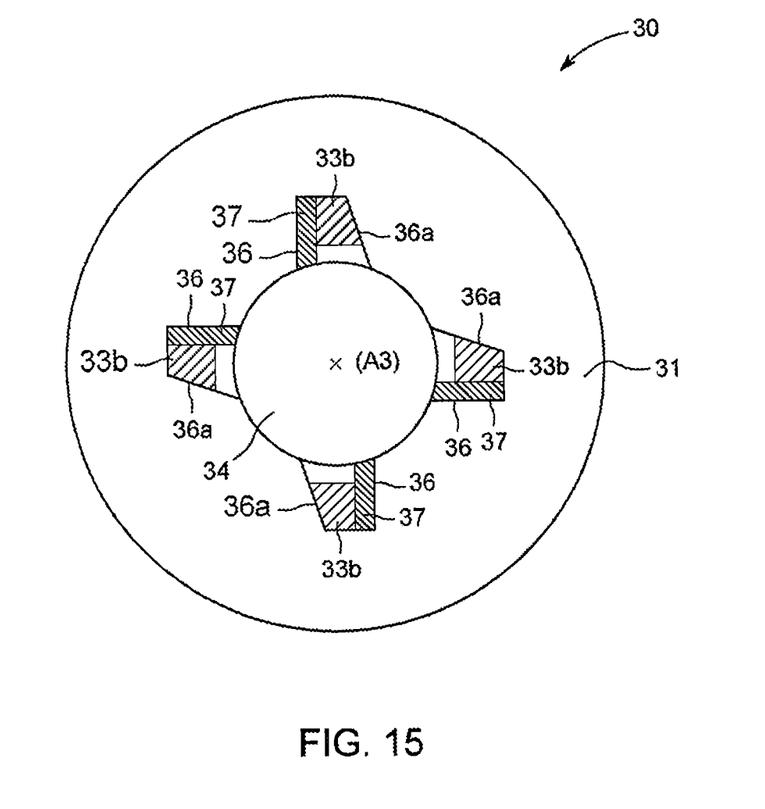
Figure 16:
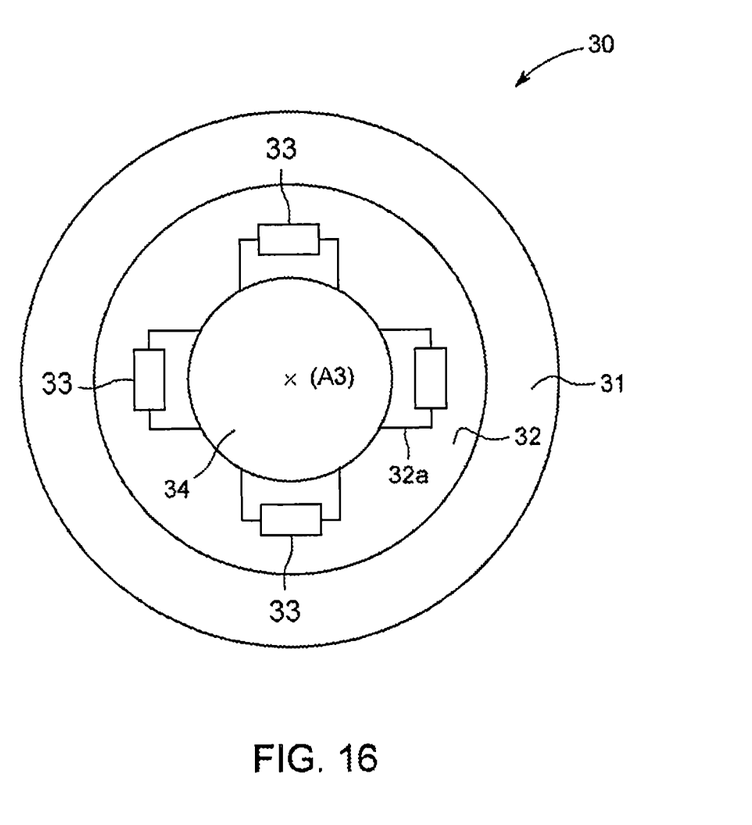

FIGS. 14, 15 and 16 illustrate respectively a half-section of a fifth embodiment of a rotor 30 of cylindrical form of a rotating electric machine, a section according to section IX-IX shown in FIG. 14, and one end of the rotor 30. The rotor 30 is intended to be inserted into a stator, for example in one of the stators described above. It includes an axis of revolution (A3).

The magnetic sheets are kept compacted and immobilized in a radial direction and in rotation according to a second embodiment of the magnetic circuit. The rotor 30 comprises the circuit CM3, which is a magnetic circuit comprising packs of magnetic sheets 31 hollowed at the center and compacted between two clamping plates 32 arranged on either side of the rotor retained by retaining bars 33 distributed uniformly or not on an inner periphery of magnetic sheets in the direction of the axis (A3), and a shaft 34. The sheet packs are held here for example by four retaining bars 33.

The shaft 34 is inserted into the central recess of the plates 31 and held in the recess, for example by hooping, by keying or any other method known to those skilled in the art. The magnetic circuit CM3 may include further not shown windings held by notches formed by the magnetic sheets stacks or for example copper bars connected together and arranged regularly on a periphery of magnetic sheets so as to form a squirrel's cage. Two adjacent magnetic sheets 31 may be separated by spacers 35 so as to create a ventilation channel as shown here. Each magnetic sheet comprises a indentation 36 on its inner perimeter as shown in FIG. 9.

The bars 33 include as shown here at each of their ends a groove 33*a* is configured to receive the clamping plate 32. According to other embodiments, the retaining bar 33 may comprise at one of its two ends a groove 33*a* configured to receive the clamping plate 32 and the other end of the bar 33 may for example be welded to a clamping plate 32 or fixed by clamping, keying or screwing to the clamping plate 32. The central part 33*b* of bar 33 may be section rectangular, cylindrical, square or trapezoidal as shown in FIG. 15. The clamping plates 32 have openings 32*a* on an inner periphery.

The openings 32*a*, the grooves 33*a* and the central portion 33*b* form a second configuration of holding and immobilizing means configured to maintain the compacted magnetic sheets and immobilize them in axial and radial directions, and to prevent the rotation of the sheets in one direction axial (A3). The shape of the indentation 36 is configured so that when the central portion 33*b* is depressed into the indentation, the magnetic sheet is immobilized in a radial direction and rotated in the axial direction (A3).

Here, the indentation 36 has a trapezoidal shape so that when the bar 33 is in place, it is accommodated in the indentation 36 of the same trapezoidal shape and dimensions such that the bar 33 can be inserted into the indentation. The indentation 36 may be all oriented in a same direction, that is to say, the inclined portions 36*a* are oriented in the same direction, for example according to the clockwise rotation about the axis (A3) or alternately disposed in the clockwise then counterclockwise as shown here. The first and second configurations of the retaining and immobilization means are transposable in the case of a stator or a rotor of a rotary electric machine.

In the case of a stator, the bars 33*b* and the indentations 36 are disposed on an outer periphery of the magnetic sheets 31. A shim 37 is inserted between the indentation 36 and the bar 33 so as to lock the retaining bar 33 in the notch 36 and bears on the inclined portion 36*a*. The shim 37 may be rectangular, that is to say that the faces are parallel, as shown here or may comprise an inclined face cooperating with a milling incorporated in the retaining bar 33.

As shown in FIG. 16, each clamping plate 32 comprises as many openings as 32*a* bars 33 distributed uniformly or not in a periphery interior of the clamping plate 32 according to the direction axial (A3). In the case of a stator, the bars 33 are distributed at the outer periphery e of the clamping plate 32 in the axial direction (A3). The opening 32*a* is configured such that the bar 33 can pass through the opening in the direction of its length. The shaft 34 may participate to maintain the sheets 31 in the blocking of retained bar 33 in the direction of radial if the game radial between the bar 33 and the shaft 34 is less than the depth radially of the groove 33*a*. The clamping plate 32 is always resting on one of the faces of the groove 33*a*, even if the bar 33 moves radially, because the bar is stopped radially by the shaft 34. Therefore, the sheets 31 are kept compacted axially. In the case of a stator, the stator chassis can participate in the maintenance of the magnetic sheets by blocking the retaining bar 33 in the radial direction if the radial clearance between the bar 33 and the chassis 14 is less than the radial depth of groove 33*a*.

The magnetic sheets are held in a radial direction and on rotation according to the axis (A3) through the central portion 33*b* and the shim 37 cooperating with the indentation 36, and in a direction axial with the groove 33*a* of the retaining bar 33. The bar 33 is for example machined, molded. It is made for example of steel, aluminum, copper or cast iron.

Advantageously, the magnetic circuit CM3 of the rotor 30 is removable from the shaft 34 without de-compacting the magnetic sheets 31. It suffices to unmounting the magnetic circuit CM3 and to withdraw the circuit CM3 from the shaft 34. In the case of a stator, it is sufficient to separate the CM3 magnetic circuit of the stator frame and remove the circuit CM3 the chassis 25.

The immobilization of the magnetic sheets according to a radial direction and in rotation according to an axial direction (A3) can be done in a different direction from maintaining the axial compaction of the magnetic sheets. Here, the immobilization of the sheets in a radial direction and in rotation in the radial direction (A3) is done by contact between the inclined face 36*a* of the indentation incorporated in the sheets 31 cooperating with the central portion 33*b* of the bar in a direction perpendicular to the radial direction. The maintaining of the compaction in an axial direction of the sheets 31 is achieved by the groove 33*a* resting on a rim of the opening 32*a* incorporated in the clamping plate 32 in the radial direction.

The immobilization of the magnetic sheets according to a radial direction and in rotation according to an axial direction can be carried out in a direction different from the direction of keeping the compaction of the magnetic sheets as shown here, the two directions being perpendicular or in the same direction. The two functions, on the one hand compaction and, secondly, radial immobilization and rotation according to an axial direction are independent. A bar can perform one or both of the two functions at a time. Thus, in various embodiments, a retaining bar may include a central immobilizing portion of the magnetic sheets and ends having grooves for maintaining the compaction of the sheets. Nevertheless, it is not beyond the scope of the invention when a retaining bar retains the central locking portion but uses at its ends conventional solutions of the type keying, clamping, welding.

Figure 17:
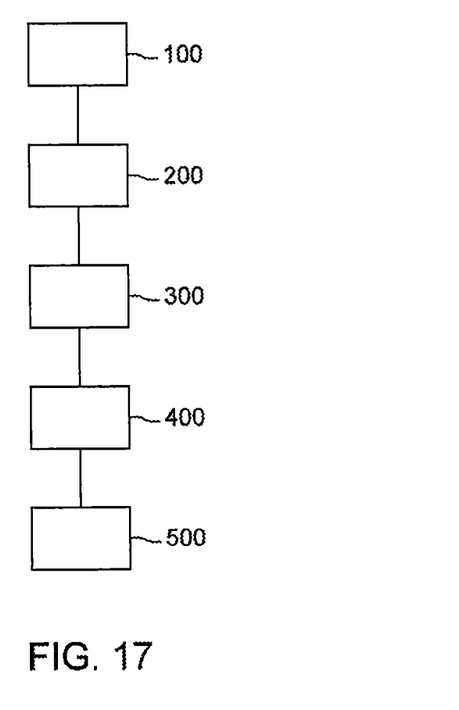
FIG. 17 describes a method for obtaining a magnetic circuit according to the fifth embodiment a magnetic circuit of which the sheets are held and immobilized compacted and are embedded in a rotor.

FIG. 17 illustrates a method for obtaining the rotor 30. In a step compaction 100, the packs of magnetic sheets 31 separated by spacers 35 or unseparated, and clamped between the two clamping plates 32 with the openings 32a are compacted such as by a press. When the required compaction pressure is reached, in a mounting step 200, a first retaining bar 33 is set up so that the inclined portion of the trapezoidal profile of the bar 33 is in contact with the inclined portion 36a of the indentation 36 and one side of each of the grooves 33a is in contact with one of the plates 32.

Then, in a locking step 300, the shims 37 are put in place so that the bar 33 is immobilized in the indentation 36. The operations 200 and 300 are repeated until all the bars 33 are mounted in the circuit CM3. Then in a step 400, the magnetic circuit CM3 obtained is extracted from the press. The groove 33a in abutment on the clamping plate 32 maintain axial compaction of the magnetic sheets. In a mounting step 500, the magnetic circuit CM3 and the shaft 34 are secured for example by a method of shrinking or keying. The magnetic sheets are held compacted and immobilized in a radial direction and a rotation about the axis (A3) motor rotation is prevented. No welding is necessary which reduces the duration of assembly operations. The magnetic circuit CM3 can be pre-assembled thus the operations of handling, planning and manufacturing are simplified. Such as stators and rotor described require no welding operation, material surface required in the clamping plates for the development of a weld bead can be used to increase the volume of magnetic sheets. For example, for the same outer diameter of the chassis of a stator of a rotating electrical machine, the magnetic circuit comprises of more magnetic sheets by a larger outside diameter, therefore the power developed by the rotating electrical machine is increased. The resulting magnetic circuits can be pre-assembled and easily handled and manipulated.

Maintenance or repair of a rotating electrical machine incorporating a magnetic circuit as described above is facilitated. A magnetic circuit as described above can be incorporated and secured respectively to a shaft or a chassis before or after the winding operation according to the planning of the manufacturing operations of a rotating electrical machine incorporating the stator and/or the rotor comprising the magnetic circuit. Preferably, the magnetic circuit is integrated and fixed to the shaft or to the chassis after the winding operation making the realization of the magnetic circuit independent of the tree production operations or chassis.

Furthermore, the adjustment operations of the prestressing of axial compaction magnetic sheets are facilitated in the case of realization of several copies of the same rotor or stator. Depending on the number of packs of magnetic sheets and the spacer stages, the value of the axial compaction prestress is fixed by the length of the central portion of the restraining bar, meaning the distance between the bearing faces of the grooves intended to be in contact with the clamping plates. This distance fixes the compressed length, therefore the axial compaction pressure of the magnetic sheets. Just adjust this length on the first copy produced and then reproduce the retaining bar designed for subsequent copies. The retention bar is carried out in particular by machining to achieve with an accuracy improved over known prior art solutions the distance between the bearing faces of the grooves intended to be in contact with the clamping plates. As a result, the parallelism between the clamping plates is improved.

The parallelism between the two clamping plates obtained by precise usage of the distance between the bearing faces of the grooves with the milling means known to the prior art is improved with respect to bars welded on clamping plates. In addition, the improvement in achieving parallelism between the two clamping plates makes it possible to distribute the axial compaction pressure over the entire surface of the clamping plates so that the compacting pressure is homogeneous throughout the magnetic circuit.

Therefore, the embodiments reduce the risk of insufficient compaction, particularly at the end of the winding notches, which may cause vibrations of the magnetic sheets likely to deteriorate the isolation of electric windings by abrasion by vibration. The retaining bar can contribute either at its end to the function of maintaining the axial compaction of the sheets, or to the immobilization of the sheets in a radial direction and in rotation in the radial direction (A3) if it includes a trapezoidal profile in its central part, or combine the two functions as shown in FIGS. 8 and 9 or 14 to 16.

What is claimed is:

1. A magnetic circuit for a rotating electrical machine comprising:
    a plurality of compacted magnetic sheet stacks disposed in an axial direction, wherein the compacted magnetic sheet stacks are sandwiched between two clamping plates connected by removable retaining bars;
    wherein at least one of the two clamping plates include as many openings as removable retaining bars;
    wherein the openings of the at least one of the two clamping plates and at least one end of each of a selection of the removable retaining bars are set to cooperate so that the at least one end of each selected removable retaining bar engages on a rim of a respective opening; and
    wherein the at least one end of the selected retaining bars has a groove cooperating with the respective opening of the at least one clamping plate to hold the magnetic sheet stacks compacted in the axial direction.

2. The magnetic circuit according to claim 1, wherein the at least one end of the selected retaining bars comprises an insert and screwed or welded part so that the selected retaining bar and the insert form a hook cooperating with the respective opening of the at least one clamping plate for holding the magnetic sheet stacks compacted in the axial direction.

3. The magnetic circuit according to claim 1, wherein each selected retaining bar engages in a radial direction on the rim of the respective opening.

4. The magnetic circuit according to claim 1, wherein each selected retaining bar engages in a direction perpendicular to a radial direction on the rim of the respective opening.

5. The magnetic circuit according to claim 4, further comprising at least one screw, each selected retaining bar includes at the at least one end the groove cooperating with the respective opening of the at least one clamping plate to hold the magnetic sheet stacks compacted in the axial direction, the at least one clamping plate comprising at least one fastening region comprising threads cooperating with the at least one screw so that when the at least one screw is screwed in the threads, the groove is nested on an edge of the opening opposite a fixing zone.

6. The magnetic circuit according to claim 1, wherein the selected retaining bar comprises between its two ends a central portion and each magnetic sheet includes at least one recess configured to receive the central portion so that the magnetic sheets are immobilized in a radial direction and in rotation in the axial direction.

7. The magnetic circuit according to claim 6, wherein at least the central portion of the selected retaining bar has a rectangular shape, a cylindrical shape, a square shape or a trapezoidal shape.

8. A magnetic circuit for a rotating electrical machine comprising:
   a plurality of compacted magnetic sheet stacks disposed in an axial direction, wherein the compacted magnetic sheet stacks are sandwiched between two clamping plates connected by removable retaining bars;
   wherein at least one of the two clamping plates include as many openings as removable retaining bars;
   wherein the openings of the at least one of the two clamping plates and at least one end of each of a selection of the removable retaining bars are set to cooperate so that the at least one end of each selected removable retaining bar engages on a respective rim of a respective opening;
   wherein at least one first selected retaining bar engages on a first rim of a first opening of the at least one clamping plate in a first direction perpendicular to a radial direction; and
   wherein at least one second selected retaining bar, which is identical to the at least one first selected retaining bar, engages on a second rim of a second opening of the at least one clamping plate in a second direction perpendicular to the radial direction and opposite the first direction of the at least one first selected retaining bar to hold the magnetic sheet stacks compact in the axial direction.

9. A magnetic circuit for a rotating electrical machine comprising:
   a plurality of compacted magnetic sheet stacks disposed in an axial direction, wherein the compacted magnetic sheet stacks are sandwiched between two clamping plates connected by removable retaining bars;
   wherein at least one of the two clamping plates include as many openings as removable retaining bars;
   wherein the openings of the at least one of the two clamping plates and at least one end of each of a selection of the removable retaining bars are set to cooperate so that the at least one end of the selected removable retaining bar engages on a rim of a respective opening;
   wherein the selected retaining bar comprises between its two ends a central portion and each magnetic sheet includes at least one recess configured to receive the central portion so that the magnetic sheets are immobilized in a radial direction and in rotation in the axial direction; and
   wherein the selected retaining bar comprises in the at least one end a groove cooperating with the respective opening of the at least one clamping plate for maintaining the magnetic sheet stacks compacted in the axial direction, and comprising at least one wedge configured so that when the at least one wedge is pressed in the axial direction between the selected retaining bar and an edge of the respective opening, the central portion of the selected retaining bar abuts against an edge of a notch and the bottom of the groove is not in contact with the at least one clamping plate so that the magnetic sheets are immobilized in the radial direction and in rotation in the axial direction.

10. The magnetic circuit according to claim 9, wherein the selected retaining bar further comprises at the at least one end a chamfer and the at least one wedge comprises an inclined face cooperating with the chamfer.

11. The magnetic circuit according to claim 10, wherein the inclined face, the chamfer, the groove, the notch and the profile of the central portion are configured so that the at least one wedge is pressed from the outside of the magnetic circuit between the chamfer and the edge of the respective opening.

12. The magnetic circuit according to claim 10, wherein the inclined face, the chamfer, the groove, the notch and the profile of the central portion are configured so that a shim is depressed from the inside of the magnetic circuit between the chamfer and the edge of the respective opening.

13. A rotor of an electric machine, comprising:
   a magnetic circuit including a plurality of compacted magnetic sheet stacks disposed in an axial direction, wherein the compacted magnetic sheet stacks are sandwiched between two clamping plates connected by removable retaining bars;
   wherein at least one of the two clamping plates include as many openings as removable retaining bars;
   wherein the openings of the at least one of the two clamping plates and at least one end of each of a selection of the removable retaining bars are set to cooperate so that the at least one end of each selected removable retaining bar engages on a rim of a respective opening; and
   wherein the at least one end of the selected retaining bars has a groove cooperating with the respective opening of the at least one clamping plate to hold the magnetic sheet stacks compacted in the axial direction.

* * * * *